United States Patent [19]

Lefsky et al.

[11] Patent Number: 4,750,154

[45] Date of Patent: Jun. 7, 1988

[54] MEMORY ALIGNMENT SYSTEM AND METHOD

[75] Inventors: Brian Lefsky, West Newton; Paul K. Rodman, Ashland; Stephen S. Corbin, Natick, all of Mass.

[73] Assignee: Prime Computer, Inc., Natick, Mass.

[21] Appl. No.: 629,349

[22] Filed: Jul. 10, 1984

[51] Int. Cl.⁴ ............................................. G11C 5/00
[52] U.S. Cl. ......................................................... 365/189
[58] Field of Search ................... 364/200, 900; 365/78, 365/77, 189, 4, 221, 189

[56] References Cited

U.S. PATENT DOCUMENTS

| | | | |
|---|---|---|---|
| 4,228,521 | 10/1980 | Schwartz | 365/4 |
| 4,347,587 | 8/1982 | Rao | 365/189 |
| 4,388,701 | 6/1983 | Aichelmann, Jr. et al. | 365/77 |
| 4,395,764 | 7/1983 | Matsue | 365/78 |
| 4,418,399 | 11/1983 | Sakurai | 365/189 |
| 4,433,394 | 2/1984 | Torii et al. | 365/221 |
| 4,507,731 | 3/1985 | Morrison | 364/200 |
| 4,532,559 | 7/1985 | Long et al. | 360/51 |
| 4,561,071 | 12/1985 | Hashimoto et al. | 365/189 |
| 4,602,365 | 7/1986 | White et al. | 370/85 |

Primary Examiner—Gareth D. Shaw
Assistant Examiner—John G. Mills
Attorney, Agent, or Firm—Lahive & Cockfield

[57] ABSTRACT

A memory alignment system and method are disclosed having a memory bus designed to accommodate more than one write instruction at a time and where data from different write instructions are merged together when the writes are destined for alignable locations in memory. In one embodiment, a write buffer and a comparator are configured to compare successive instructions for alignable destination addresses. In another embodiment, a content associative buffer is employed to compare the address of a write instruction with the addresses of all other stored write instructions. A variable scheduler to control the unloading of the buffer is also disclosed as is an apparatus for merging data read from memory with data awaiting transmission to memory to obtain the most up-to-date version.

10 Claims, 3 Drawing Sheets

MEMORY ALIGNMENT SYSTEM AND METHOD

BACKGROUND OF THE INVENTION

The present invention is in the field of data processing and, in particular, relates to systems for improving the transfer of data between processors (or other input/output devices) and memory or data storage devices.

High speed computer systems employ memory devices to store data generated or modified by a processing unit or the like. The transfer of data to the memory is typically referred to as a "write instruction" or a "write." In most computer systems, the memory bus, across which data is transferred, is the same width as the buses employed by the processor to manipulate or generate data. Typically, processors operate on 16-bit or 32-bit strings of data values.

When a processor sends successive write instructions to memory, performance is compromised because the time required to transfer data is much greater than the processor's internal data manipulation cycle time. The processor must wait until each write instruction has been performed before continuing operations.

The conventional method for reducing performance costs during the transfer of data from a processor to memory has been to employ a first-in, first-out (FIFO) buffer, also known as a "write buffer," to store write instructions until the buffer is full or a break in processing operations occurs, at which time the buffer entries are unloaded serially into the memory. However, the value of a write buffer is dependent upon its depth as well as type of operations being performed by processor. Each write instruction will fill a separate location in the buffer and must be unloaded individually. A series of write instructions can quickly fill even a large write buffer.

Additionally, a problem can arise in the use of a write buffer when other operations, such as "read instructions" or "reads," are performed. A read instruction is a request to transfer data from memory to the processor. In order to avoid the possibility of a processor operating on stale data, in conventional systems all pending write instructions in the write buffer must be loaded into memory before a read instruction can be executed. The problem posed by the delay of read instructions while all pending write instructions are executed is often referred to as the "read latency" problem.

There exists a need for data transfer control systems which provide a way to transfer data to memory in quantities greater than the limits imposed by the width of the processor's data paths, e.g., greater than 16 bit or 32 bit operations. Such a system should allow the processor to continue operations with fewer interruptions for data transfer. Moreover, a system that alleviates or reduces the read latency problem associated with the execution of read requests when a write buffer is employed, would represent an advance in the field. A system having the above characteristics would be a substantial improvement over prior art techniques and would satisfy a long-felt need in the industry.

SUMMARY OF THE INVENTION

A memory alignment system is disclosed having a memory bus designed to accommodate more than one write instruction at a time and wherein data from different write instructions are merged together when the data are destined for "alignable" locations in memory. For purposes of this disclosure, "alignable" is intended to mean data locations situated in a defined grouping, block or "line" within the system's memory. A "line" of memory thus can include two, three, four or more data locations.

In one simple embodiment, a write buffer and a memory controller are configured to compare the address of each write instruction with the address of the last write entered in the buffer. When the two successive writes are destined for alignable locations in memory, a routing circuit aligns the data associated with the two write instructions in the buffer thus permitting them to be sent to memory together. In this system, the buffer-loading mechanism is only incremented if the successive writes cannot be aligned.

One embodiment of the present invention, which has been implemented in the 9950 model computer system manufactured by Prime Computer, Inc. of Framingham, Mass., cooperates with a processor that can send both 16-bit and 32-bit writes to memory. The 9950 memory is organized as pairs of 32-bit words (i.e. a 64-bit "line"), and two types of alignment are possible. In a "minor alignment" two 16-bit writes are merged into a 32-bit write. In a major alignment two 32-bit writes are merged into a 64-bit write. Of course, other alignment schemes, such as 48-bit alignments can also be implemented, if desired.

In another embodiment of the invention, a "smart" buffer is implemented with the capability of searching all the buffer-stored instructions for a write instruction having a destination address in memory alignable with a newly received write instruction. Whenever a line-match is found, the data associated with the two writes are merged or aligned together in the buffer to await transfer to memory. Such a buffer can be implemented in hardware employing a small Content Associative Memory ("CAM").

In another aspect of the invention a variable operation scheduler is disclosed that delays the actual transfer of data from the buffer to memory based on how full the buffer is at a given time. Since the write buffer permits the processor to continue operating until the buffer is full, the scheduler enhances the write-collapsing features of the buffer, particularly the CAM-implemented buffer, by ensuring that the buffer runs at nearly its full capacity most of the time.

In a further aspect of the invention the CAM-implemented buffer can also be employed to alleviate the read latency problem. Rather than empty the buffer whenever a read request is received (in order to ensure that the data sent to the processor is the latest version), the CAM buffer can be polled before or at the same time the memory tranfers its data to the processor. If an address of data sought in the read request matches an address in the buffer, the buffer-stored data is transferred to the processor and the memory-stored data is discarded.

The invention will next be described in connection with certain preferred embodiments. However, it should be clear that various changes, modifications and additions can be made by those skilled in the art without departing from the spirit or scope of the invention. For example, although 16-bit and 32-bit processors are described in detail below, various modifications of the data word size and memory line widths can also be implemented.

DESCRIPTION OF THE PREFERRED EMBODIMENTS

Figure 1:
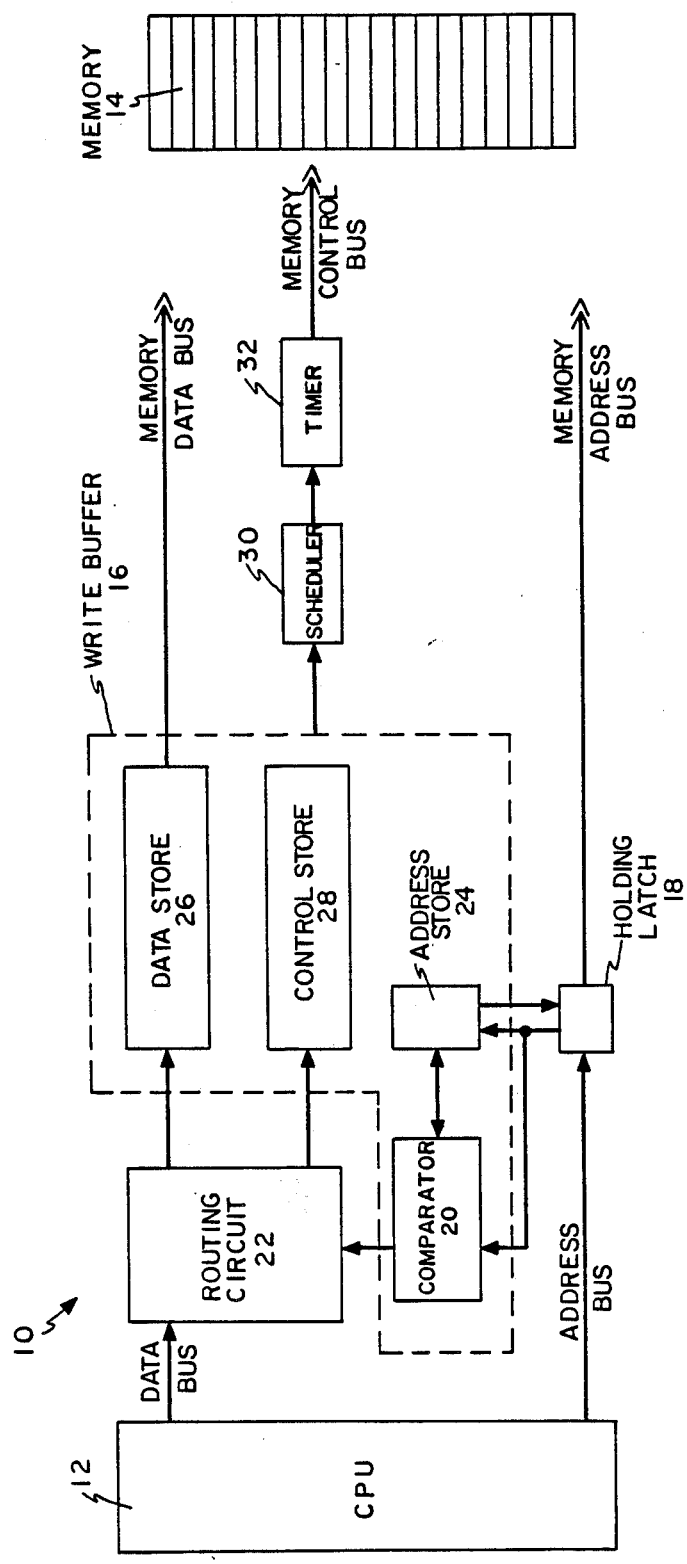
FIG. 1 is a schematic block diagram of a memory alignment system according to the invention.

In FIG. 1, a schematic diagram of a memory alignment system 10 is shown disposed between a central processing unit ("CPU") 12 and a memory 14. The alignment system includes a write buffer 16, a holding latch 18 and a routing means 22. In one preferred embodiment, the alignment system also includes a scheduler 30 and a timer 32. The write buffer 16 further includes a comparator 20, an address store 24, a data store 26 and a control store 28 for validity bits and related control bits.

In the illustrated embodiment, the data store 26 of write buffer 16 is divided into rows, each row representing a block of data words (up to four 16-bit words or two 32-bit words) destined for alignable locations in memory 14. Associated with each row of the data store 26 having data entry is an address tag stored in address store 24. In a simple embodiment, an address transmitted from processor 12 is held by latch 18 and compared in comparator 20 with the last address entered in address store 24. If a line-match occurs, the data associated with the matched address is routed by routing circuit 22 and aligned with the previously stored data in the same row in the data store 26. In the data store 26 the write instructions are thus merged. If a line-match does not occur the routing circuit 22 directs the associated data into the next empty row in the data store 26. Control store 28 contains a validity bit for each location available in the data store 26 and serves to indicate whether data is stored in a particular location. By the number and location of validity bits set, the type of write instruction (e.g., a 16-bit or 32-bit write) is ascertained. Write buffer 16 can be unloaded by conventional means or by employing a variable operation scheduler, discussed below.

Figure 2:
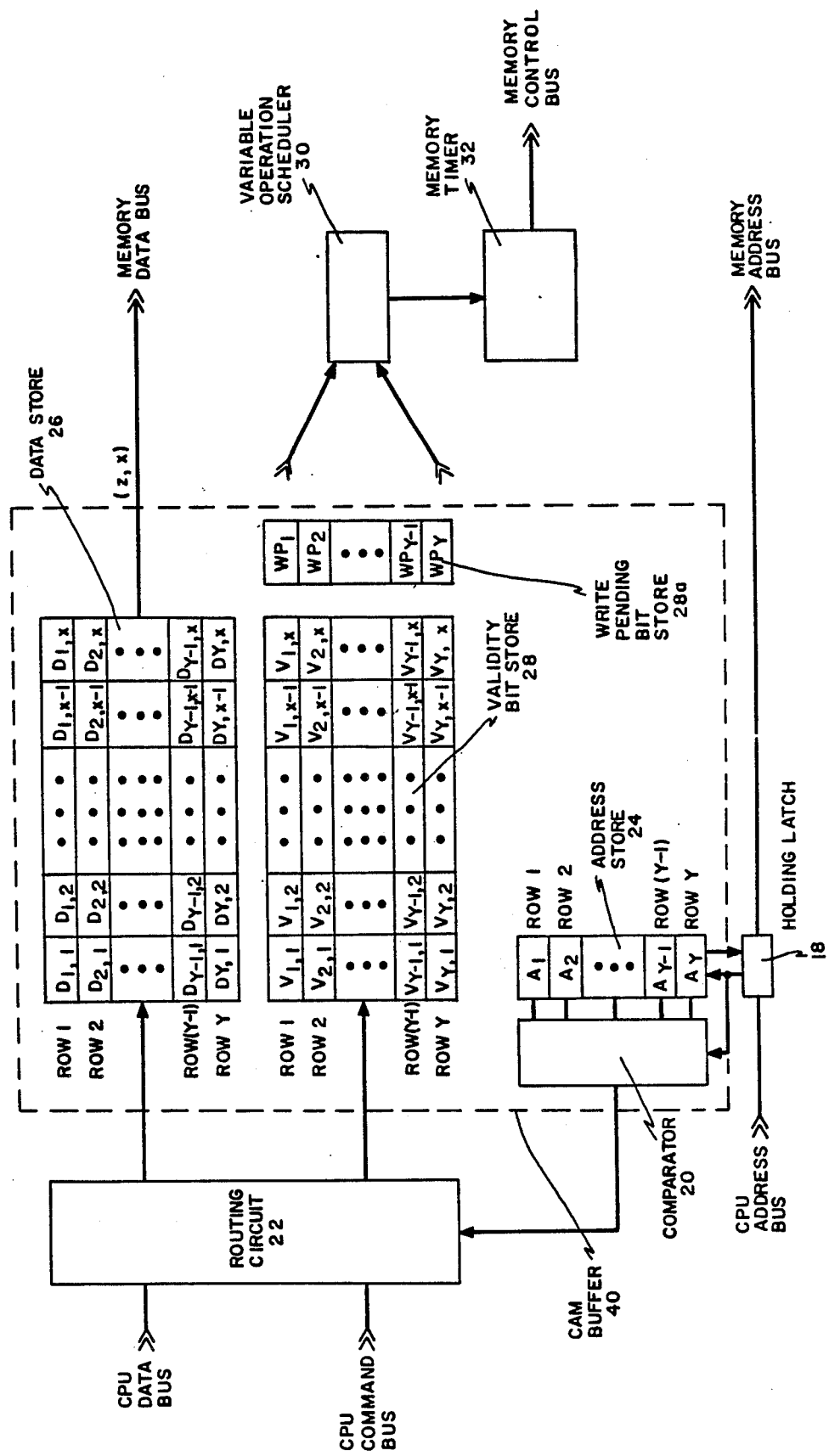
FIG. 2 is a more detailed schematic block diagram of a memory alignment system employing a CAM-buffer.

In FIG. 2 the structure of the write buffer 16, consisting of a content associative memory (CAM) write buffer 40, is shown in detail. The data store 26 of this buffer consists of Y rows, each of which is X locations wide to yield (X·Y) locations overall. Each location is designed to store Z data bits (corresponding to the smallest string of bits typically handled by the processor). For an illustrative data processing system generating 16-bit or 32-bit write instructions, the buffer can be four rows deep and four locations wide with each location holding a 16-bit word.

Each location in the data store 26 has an associated validity designation stored in validty store 28 which indicates whether or not data is stored in that block. It is also preferred to have a write pending bit 28a associated with each row to indicate whether a row in the data store 26 contains a write instruction in one of the blocks. In the illustrated embodiment, the write pending bits together with the validity bits identify the type of write instruction, i.e., a 16-bit or a 32-bit write. The CAM write buffer 40 also includes an address store 24 which stores the main memory address for each pending write instruction.

In operation, write instructions are transmitted from the CPU along the data, address and command buses. (Of course, a single physical line with multiplexed signals can be used also.) In the illustrated embodiment, the address is held by latch 18 as described above in connection with FIG. 1 and compared in comparator 20 with all of the addresses of pending write instructions already stored in the CAM buffer 40. If a line-match is found anywhere in the buffer 40, the new data is routed to the appropriate row by routing circuit 22. The validity bits 28 are then updated to indicate the greater width of the merged write instruction. If no match is found, the data is routed to a new row in the data store 26 and the corresponding validity and write pending bits are updated to indicate the presence and width of the new write instruction.

It should also be noted that the present invention permits one to align data strings from write instructions that are destined for the same line of memory even if the addresses are not adjacent (e.g., the first and fourth locations in a four location line of memory). Moreover, the alignment system permits the processor to modify single write instructions that have not yet been posted to memory. When the comparator 20 receives a write instruction destined for the same location in memory as a write already stored in the buffer, routing circuit 22 writes over the old instruction with the new data.

The CAM buffer 40 can be used in conjunction with a variable operation scheduler 30 and memory timer 32 as also shown in FIG. 2. The timer 32, for example, can be a conventional controller for unloading write instructions from a buffer into memory operating at the appropriate times during the operations cycle of the system. The scheduler 30 provides an overriding control on the timer 32 designed to optimize the use of the buffer's capacity. The scheduler 30 can be implemented by programmed read-only-memory ("PROM") devices which monitor the validity bits and write pending bits for each row in the CAM buffer 40. Preferably each PROM also monitors the locations in other rows for pending writes and "posts" a write instruction to memory according to an algorithm that ensures that the buffer 40 is used in an optimal fashion.

In the scheduler 30 the write pending bits from each of the rows of the write buffer along with the validity bits are examined to determine what types of operations are waiting to be performed. Although the memory timer circuit is capable of transferring data widths smaller than the maximum if the write buffer does not contain valid data for the entire row, it is desirable to transfer the greatest amount of data possible per memory cycle. Therefore, the variable operation scheduler preferably is designed to give relative priority to the various write buffer locations; that is, the rows with the greatest amount of valid data are given highest priority. The highest priority requests are then posted to the memory timer for processing.

By processing the rows with the greatest amount of valid data first, time is provided for other locations within a row having a pending write instruction to receive more data. In addition, requests are masked by the operation scheduler relative to how full the buffer is overall. This feature allows the deferral of writes during short bursts of memory read activity where it is not desirable to stop the memory timer from processing read operations. As the write buffer begins to fill, however, the highest priority writes are allowed to be processed. A facility for enabling all operations to be posted is provided to improve overall system reliability. Preferably, all pending write operations are processed periodically, regardless of how full the buffer is, to avoid, for example, loss of data in the event of a power failure where main memory has battery-backup facilities but the write buffer does not.

For example, in a CAM buffer having four rows with each row capable of holding up to four 16-bit data words, scheduler 30 can be programmed to post a write instruction whenever all four locations (64 bits) in a row are filled. Likewise, the scheduler 30 can be programmed to post a two location (32 bit) instruction whenever one of the other three rows has stored data, or to post a one location (16 bit) write whenever two of the other three rows has an entry. The program preferably also includes a command to unload the buffer periodically, i.e., for n microseconds for every m microsecond regardless of "fullness".

Figure 3:
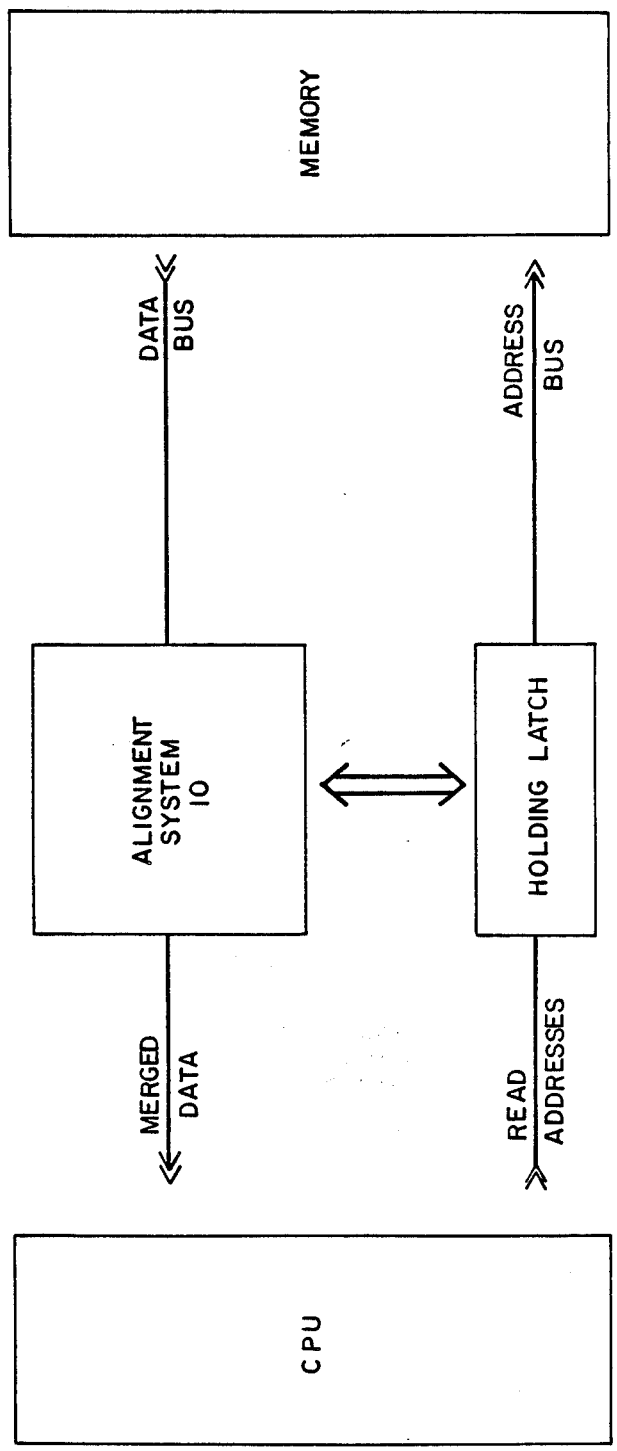
FIG. 3 is a schematic block diagram of a system employing a CAM-buffer to respond to data-reading requests.

In FIG. 3, a system is shown for reducing the read latency problem employing the alignment system 10 of the present invention. The alignment system 10 preferably includes the CAM buffer 40 described above in FIG. 2, and has the same architecture of data, validity and address stores. In most computer systems a read instruction requires the unloading of all pending write instructions first to avoid the possibility of operations on stale data. However, in the present invention, the content associative memory used to merge write instructions can also be used to advantage in processing read requests. In operation, a request by a processor to read data from memory is passed through a holding latch 18 as shown in FIG. 3, where the address of the read request is compared with each of the addresses stored in the address store of the alignment system. If no match is found, the read request is transmitted to the memory. However, if a match is found, the alignment system 60 contains routing circuitry to transmit a copy of the data to the processor directly from the write buffer. Moreover, if part of the requested data is in the CAM buffer 40, the remainder of the unchanged data from the memory can be combined with the portion residing in the buffer 40 by the routing circuit 22, thereby providing the CPU 12 with the most up-to-date version of the data requested.

Having disclosed a novel alignment system and described illustrative embodiments and operations, modifications, additions and subtractions are intended to be covered by the following claims.

What is claimed is:

1. A memory alignment system for use in a digital data memory storage system having a central processor capable of operating on data words of at least one defined width,
   a memory having a plurality of locations having defined addresses, the widths of said locations corresponding to the defined widths of said data words, and the addresses further grouped into lines, each line having at least two data locations, and
   a memory writing means responsive to write instructions from the processor for transmitting data words from said processor to said memory, the writing means being capable of transmitting into said memory of at least two data words together when destined for the same line, the improvement wherein the memory alignment system comprises:

A. a write buffer means connected to the processor and the writing means, the buffer means having a plurality of rows, each row having a plurality of locations for receiving and storing data words destined for alignable locations in said memory, in association with their memory addresses,
   B. comparator means for comparing a first address of a data word previously stored in said buffer means with a second address contained in a write instruction, and
   C. routing means responsive to said comparator means for routing said data word associated with said write instruction to the same row of said write buffer as said previously stored data word when said first and second addresses are located in the line of memory, thereby enabling the writing means to transfer in a single memory write cycle at least two data words to the same line of memory.

2. The alignment system of claim 1 wherein the comparator means further comprises means for comparing addresses of successive write instructions.

3. The alignment system of claim 1 wherein the compartor means further comprises means for comparing an address of each write instruction with the addresses of a plurality of write instructions already stored in the buffer means.

4. The alignment system of claim 1 wherein the buffer means comprises:
   I. a data store having a plurality of rows for storing data portions of each write instruction;
   II. an address store for storing a memory address associated with each write instruction; and
   III. a control store associated with each row of said data store for indicating the presence and the width of write instruction stored in said row.

5. The alignment system of claim 1 wherein the defined width of the data words is 16-bits and the routing means further comprises means for routing two 16-bit data words to the same row of said write buffer.

6. The alignment system of claim 1 wherein the defined width of the data words is 32-bits and the routing means further comprises means for, routing two 32-bit data words to the same row of said write buffer.

7. The alignment system of claim 1 wherein the central processor is capable of operating on data words of both 16-bit and 32-bit widths and the routing means further comprises means for routing a plurality of 16-bit data words, 32-bit data words and combinations thereof.

8. The alignment system of claim 1 wherein the memory writing means further comprises a variable operation scheduling means for scheduling the transfer of write instructions to memory.

9. The alignment system of claim 1 wherein the write buffer means further comprises a content associative memory including an address store containing a memory address for each stored data word.

10. The alignment system of claim 1 wherein the system further comprises read processing means for processing instructions to read data addressed locations in the write buffer means, the read processing means comprising means for comparing an address of a read instruction with addresses of pending data words stored in the buffer means, and means responsive to the comparing means for substituting when a match is found, data sotred in the buffer for data read from the memory.

* * * * *